(12) United States Patent
Li

(10) Patent No.: US 10,904,964 B2
(45) Date of Patent: Jan. 26, 2021

(54) DRIVER CIRCUIT FOR CONTROLLING BRIGHTNESS OF LIGHT-EMITTING DIODE USING SWITCH UNIT AND LIGHTING CONTROL UNIT

(71) Applicant: LEEDARSON AMERICA INC., Smyrna, GA (US)

(72) Inventor: Yongchuan Li, Smyrna, GA (US)

(73) Assignee: LEEDARSON AMERICA INC., Smyrna, GA (US)

( * ) Notice: Subject to any disclaimer, the term of this patent is extended or adjusted under 35 U.S.C. 154(b) by 0 days.

(21) Appl. No.: 16/234,638

(22) Filed: Dec. 28, 2018

(65) Prior Publication Data
US 2019/0239303 A1    Aug. 1, 2019

Related U.S. Application Data

(60) Provisional application No. 62/622,948, filed on Jan. 28, 2018.

(51) Int. Cl.
| | |
|---|---|
| H05B 45/10 | (2020.01) |
| H05B 45/37 | (2020.01) |
| H02M 1/44 | (2007.01) |
| H02M 7/06 | (2006.01) |

(52) U.S. Cl.
CPC .............. *H05B 45/10* (2020.01); *H02M 1/44* (2013.01); *H02M 7/06* (2013.01); *H05B 45/37* (2020.01)

(58) Field of Classification Search
CPC ................ H05B 33/08; H05B 33/0815; H05B 33/0842; H05B 33/0845; H05B 33/0869; H05B 37/02; H05B 45/10; H05B 45/37; H02M 1/44; H02M 7/06
See application file for complete search history.

(56) References Cited

U.S. PATENT DOCUMENTS

| | | | | |
|---|---|---|---|---|
| 7,696,794 B2* | 4/2010 | Feldtkeller | .............. | H02M 1/08 326/80 |
| 8,143,810 B2* | 3/2012 | Ferro | ..................... | H05B 45/37 315/297 |
| 8,686,659 B2* | 4/2014 | Kumar | ............... | H05B 41/2806 315/210 |
| 2012/0326609 A1* | 12/2012 | Kumar | ............... | H05B 37/0209 315/88 |
| 2013/0264954 A1* | 10/2013 | Chung | ................... | H05B 45/48 315/186 |
| 2013/0334980 A1* | 12/2013 | Zhou | .................. | H05B 33/0845 315/250 |

* cited by examiner

*Primary Examiner* — Thai Pham
(74) *Attorney, Agent, or Firm* — Chun-Ming Shih; Lanway IPR Services

(57) ABSTRACT

A driver circuit for controlling brightness of a set of light-emitting diodes. The driver circuit includes a switch unit for providing n first control signals, a lighting control unit for sending a second signal, a control circuit unit coupled to the switch unit and the lighting control unit and used to send a third control signal according to the n first control signal and the second control signal, an optical coupler for generating a fourth control signal according to the third control signal, and a power control unit for enabling the light-emitting diodes according to the fourth control signal. The n first control signals and the second control signal are both adjustable.

5 Claims, 5 Drawing Sheets

DRIVER CIRCUIT FOR CONTROLLING BRIGHTNESS OF LIGHT-EMITTING DIODE USING SWITCH UNIT AND LIGHTING CONTROL UNIT

CROSS REFERENCE

This application claims priority of a provisional application 62/622,948, filed on Jan. 28, 2018.

FIELD OF THE INVENTION

The present invention relates to a driver circuit, and more particularly, a driver circuit for controlling brightness of a set of diodes using a switch unit and a lighting control unit.

BACKGROUND

Light-emitting diode (LED) has been more and more popularly used for lighting purpose. The advantages of LED light device (e.g. LED lamp) include lower power consumption, better brightness, longer life span and lower heat generation. However, it is difficult to adjust the brightness of an LED light device because controllers used for dimming conventional lamps is not feasible for dimming an LED light device. Hence, a solution for finely adjusting the brightness of an LED light device is still being required in the field.

SUMMARY OF THE INVENTION

A driver circuit for controlling brightness of a set of light-emitting diodes is disclosed. The driver circuit includes a switch unit, a lighting control unit, a control circuit unit, an optical coupler and a power control unit. The switch unit is configured to provide n first control signals, and the switch unit includes n controllable terminals configured to be set for setting the n first control signals, and n output terminals corresponding to the n controllable terminals and configured to output the n first control signals. The lighting control unit is configured to generate a second control signal, and the lighting control unit includes a first input terminal and a second input terminals configured to receive a control voltage between the first input terminal and the second input terminal of the lighting control unit, and an output terminal configured to output the second control signal according to the control voltage. The control circuit unit is configured to generate a third control signal according to the n first control signals and the second control signal. The control circuit unit includes n first input terminals coupled to the n output terminals of the switch unit and configured to receive the n first control signals, a second input terminal coupled to the output terminal of the light control unit and configured to receive the second control signal, and an output terminal configured to output the third control signal. The optical coupler is configured to generate a fourth control signal according to the third control signal. The optical coupler includes an input terminal coupled to the output terminal of the control circuit, and an output terminal configured to output the fourth signal. The power control unit is configured to enable the set of light-emitting diodes according to the fourth signal. The power control unit includes an input terminal coupled to the output terminal of the optical coupler, and a set of output terminals coupled to the set of light-emitting diodes. The set of light-emitting diodes is configured to emit light according to the fourth signal, the brightness of the set of light-emitting diodes is determined according to the fourth control signal, and n is a positive integer lager than zero.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
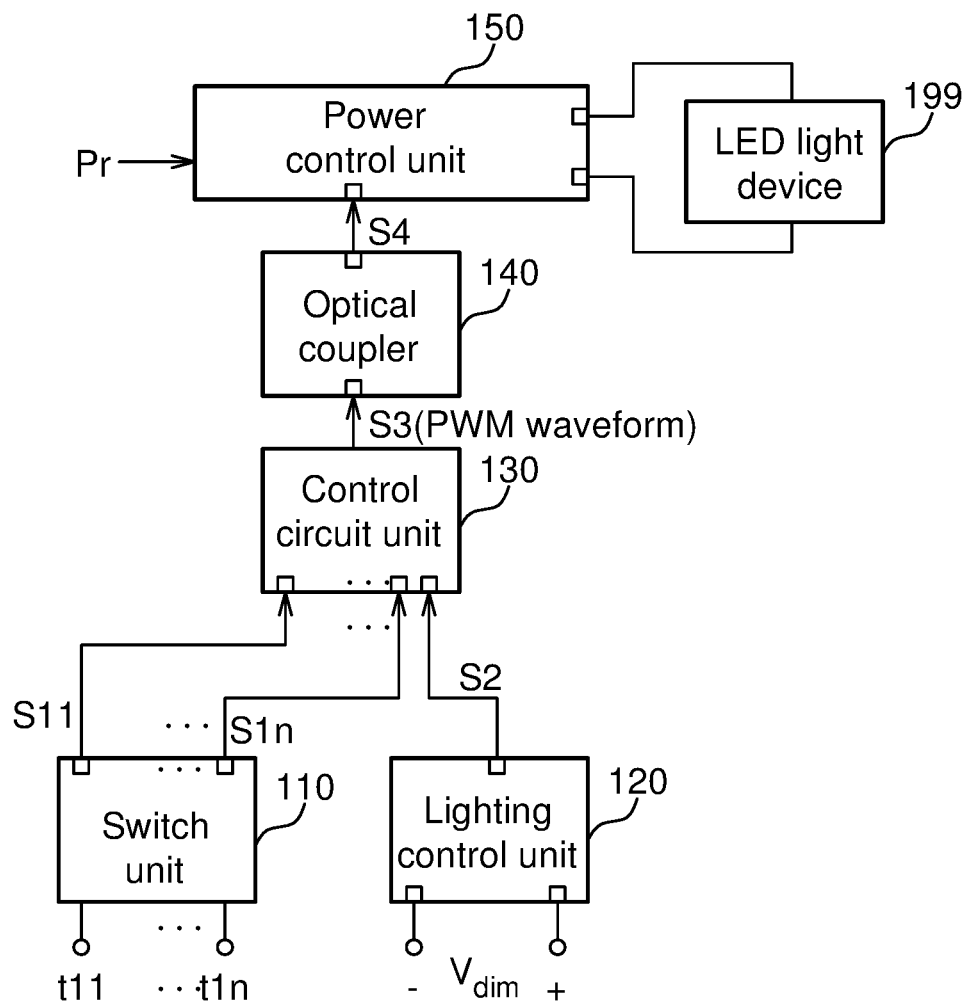
FIG. 1 illustrates a driver circuit for controlling brightness of an LED light device according to an embodiment.

FIG. 1 illustrates a driver circuit 100 for controlling brightness of an LED light device 199 according to an embodiment. The LED light device 199 may include a set of LEDs. The driver circuit 100 may include a switch unit 110, a lighting control unit 120, a control circuit unit 130, an optical coupler 140 and a power control unit 150. As shown in FIG. 1, the switch unit 110 may be used to provide n first control signals S11-S1n. The switch unit 110 includes n controllable terminals t11-t1n and n output terminals where the n controllable terminals t11-t1n are used to be set for setting the n first control signals S11-S1n, and the n output terminals are corresponding to the n controllable terminals respectively and used to output the n first control signals S11-S1n. The variable n is a positive integer lager than zero.

The lighting control unit 120 may be used to generate a second control signal S2, and the lighting control unit 120 may include a first input terminal and a second input terminal and an output terminal where the first and second input terminals are used to receive a control voltage Vdim between the first input terminal and the second input terminal of the lighting control unit 120, and the output terminal is used to output the second control signal S2 according to the control voltage Vdim.

The control circuit unit 130 may be used to generate a third control signal S3 according to the n first control signals S11-S1n and the second control signal S2. The control circuit unit 130 may include n first input terminals, a second input terminal and an output terminal, where the n first input terminal are coupled to the n output terminals of the switch unit 110 respectively and used to receive the n first control signals S11-S1n, the second input terminal is coupled to the output terminal of the light control unit 120 and used to receive the second control signal S2, and the output terminal is used to output the third control signal S3. According to an embodiment, the third control signal S3 may include a pulse width modulation (PWM) waveform as described below.

According to embodiments, the control circuit unit 130 may include a microcontroller (MCU), an application-specific integrated circuit (ASIC), a central processing unit (CPU) or another integrated circuit having functions of calculations and determination for generating the third control signal S3 according to the n first control signals S11-S1n and the second control signal S2. The control circuit unit 130 may include more input/output (I/O) terminals than the terminals (e.g. the n first input terminals, the second input terminal and the output terminal) in FIG. 1, and each I/O terminal may be implemented as a chip pin, a die pad or an accessible physical interface.

The optical coupler 140 may be used to generate a fourth control signal S4 according to the third control signal S3. The optical coupler 140 may include an input terminal and an output terminal where the input terminal is coupled to the output terminal of the control circuit 130 for receiving the third control signal S3, and the output terminal is used to output the fourth signal S4.

The power control unit 150 may be used to enable the set of LEDs of the LED light device 199 according to the fourth signal S4. The power control unit 150 may include an input terminal and a set of output terminal where the input terminal is coupled to the output terminal of the optical coupler 140 for receiving the fourth control signal S4, and the set of output terminals may be coupled to the LED light device 199. The power control unit 150 may receive electrical power Pr and supply power to the LED light device 199 as described below.

modes of the switch unit 110. In addition, the second control signal S2 may be corresponding one operation mode of m operation modes of the lighting control unit 120 since the control voltage Vdim may be a level of m predetermined levels where the variable m is a positive integer larger than zero. As a result, the brightness of the LED light device 199 may be set as a brightness level of 2n×m brightness levels. Hence, the brightness of the LED light device 199 may be finely adjusted.

According to an embodiment, the switch unit 110 may include a dual in-line package (DIP) switch unit. The n controllable terminals t11-t1n of the switch unit 110 may be n switches which are set manually. The n first control signals S11-S1n are corresponding to one operate mode of $2n$ operation modes of the switch unit 110. For example, if n=3, the first control signals S11, S12 and S13 may corresponding to one of eight binary codes: (0, 0, 0), (0, 0, 1), (0, 1, 0), (0, 1, 1), (1, 0, 0), (1, 0, 1), (1, 1, 0) and (1, 1, 1), where 0 may be a logic-0 denoting an OFF status and 1 may be a logic-1 denoting an ON status. The duty ratio Pu/Pa may be DR1-DR8 corresponding to the binary codes of the first control signals S11-S13 as shown in table-1 below.

TABLE 1

(correspondence of the setting of the switch unit 110 and the duty ratio Pu/Pa)

| | (S11, S12, S13) | | | | | | | |
|---|---|---|---|---|---|---|---|---|
| | (0, 0, 0), | (0, 0, 1), | (0, 1, 0), | (0, 1, 1), | (1, 0, 0), | (1, 0, 1), | (1, 1, 0) | (1, 1, 1) |
| The duty ratio Pu/Pa | DR1 | DR2 | DR3 | DR4 | DR5 | DR6 | DR7 | DR8 |

Note:
(1) (S11, S12, S13) may be the setting the 3 first control signals of the DIP switch of the switch unit 110.
(2) DR1 < DR2 < DR3 < DR4 < DR5 < DR6 < DR7 < DR8; and the brightness is higher when the duty ratio is larger.

The LED light device 199 may be used to emit light according to the fourth signal S4, the brightness of the set of light-emitting diodes of the LED light device 199 is determined according to the fourth control signal S4.

Figure 2:
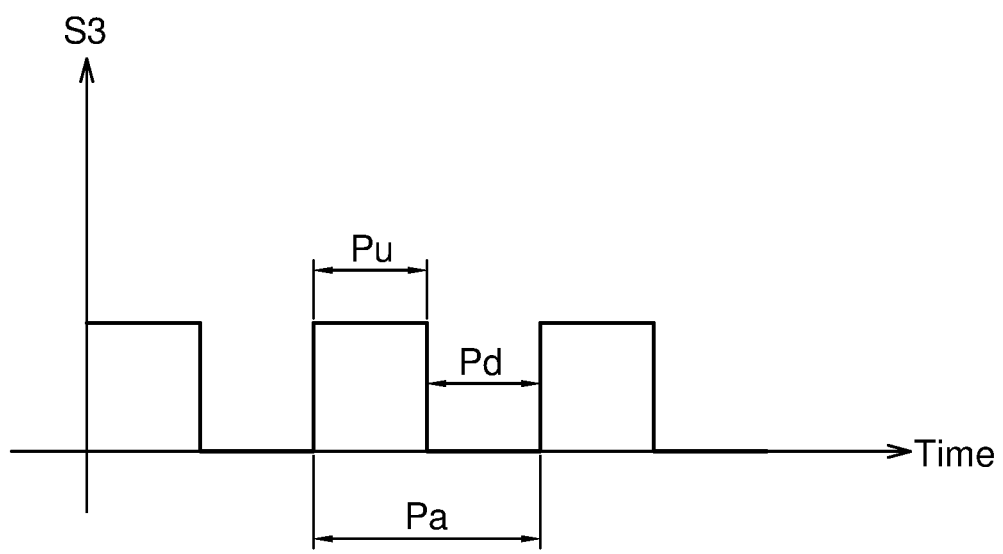
FIG. 2 illustrates a waveform diagram of the third control signal of FIG. 1.

FIG. 2 illustrates a waveform diagram of the third control signal S3 of FIG. 1. As shown in FIG. 2, the third control signal S3 may be of a square wave and have a pulse width modulation (PWM) waveform. A time-interval Pa may correspond to a period of the waveform of the third control signal S3. During the time-interval Pa, the third control signal S3 may be of an enabled voltage level within a time-interval Pu and of a disabled voltage level within a time-interval Pd. In other words, Pa=Pu+Pd, the third control signal S3 is corresponding to a duty ratio Pu/Pa, and the fourth control signal S4 is determined according to the duty ratio Pu/Pa. According to an embodiment, the fourth control signal S4 may be activated more frequently or be of a higher level when the duty ratio Pu/Pa is set higher. Therefore, the brightness of the set of light- emitting diodes of the LED light device 199 may be higher when the duty ratio Pu/Pa is higher.

The duty ratio Pu/Pa of the third control signal S3 may be determined according to the n first control signals S11-S1n and the second control signal S2. In other words, the duty ratio Pu/Pa may be determined by the setting of the n controllable terminals t11-t1n (of the switch unit 110) and the control voltage Vdim (received by the lighting control unit 120). The n first control signals S11-S1n may be set as one set of n-bit binary code (0, 0, 0, . . . , 0) to n-bit binary code (1, 1, 1, . . . , 1), so the n first control signals S11-S1n may be corresponding to one operate mode of $2n$ operation As shown in table-1, the brightness of the LED light device 199 may be adjusted as 8 different strengths according to the duty ratio. For example, the brightness may be adjusted by adjusting a used current on the LED light device to be one value of eight values between 500 mA to 700 mA. The brightness is higher when the applied current is higher. In addition, the brightness may be adjusted more finely by setting the lighting control unit 120. According to an embodiment, the lighting control unit 120 may include a 0-10V lighting controller, and the control voltage Vdim is larger than zero voltage and not larger than ten voltage (i.e. 0 volt<Vdim<10 volt). For example, if m=5, the control voltage V-dim may be one of five level. Hence, in an example of n=3 and m=3, the brightness of the LED light device 199 may be adjusted and dimmed to be one level of 23×5 levels, that is 40 levels. The numbers are merely used to be examples for describing the brightness may be finely adjusted and dimmed.

Figure 3:
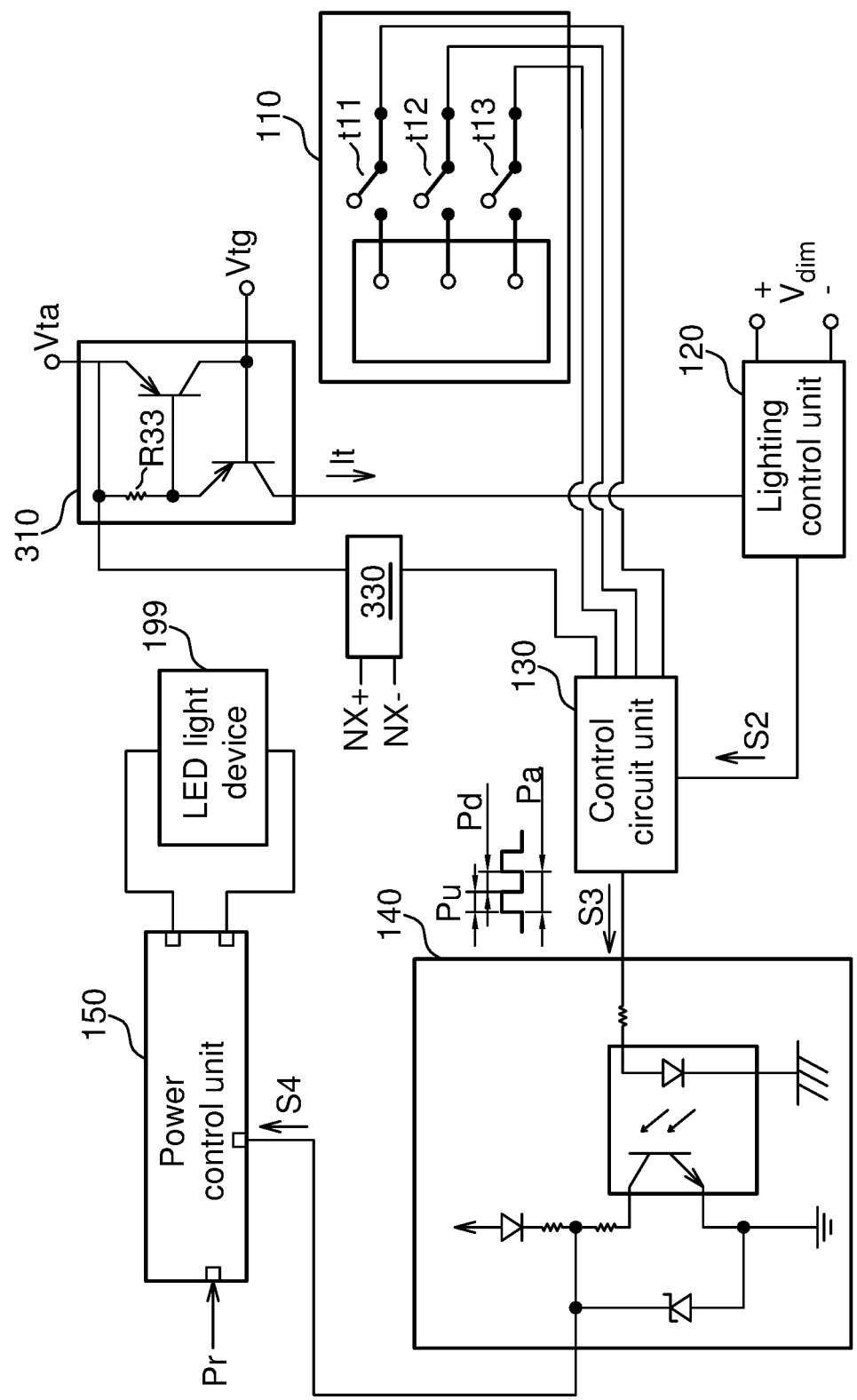
FIG. 3 illustrates more details of the driver circuit of FIG. 1.

FIG. 3 illustrates more details of the driver circuit 100 of FIG. 1. As shown in FIG. 3, the driver circuit 100 may further include a thyristor unit 310. The thyristor unit 310 may include an anode terminal, a gate terminal and a cathode terminal where the anode terminal is used to receive an anode voltage Vta, the gate terminal is used to receive a gate voltage Vtg, and the cathode terminal is used to provide an operation current It according to the anode voltage Vta and the gate voltage Vtg. The lighting control unit 120 may further include a third input terminal coupled to the cathode terminal of the thyristor unit 310. The lighting control unit may generate the second control signal S2 according to the control voltage Vdim and the operation current It.

As shown in FIG. 3, the thyristor unit 310 may be effectively formed by two transistors. The driver circuit 100 may hence perform an effect of a triode for alternating current (TRIAC).

According to an embodiment, when the thyristor unit 310 is formed with two transistors, a resistor R33 may be coupled between a first terminal and a control terminal of one of the two transistors. The driver circuit 100 may further include an adjustable circuit 330 coupled between the anode terminal of the thyristor 310 and an operation terminal of the control circuit unit 130 (e.g. a pin or pad of a MCU) so that the control circuit unit 130 may generate the third control signal S3 according to the settings of the adjustable circuit 330 and the thyristor unit 310. The adjustable circuit 330 may be set by adjusting a voltage between two nodes NX+ and NX+ and be formed with a transistor, a diode and RC (resistor-capacitor) circuits.

Figure 4:
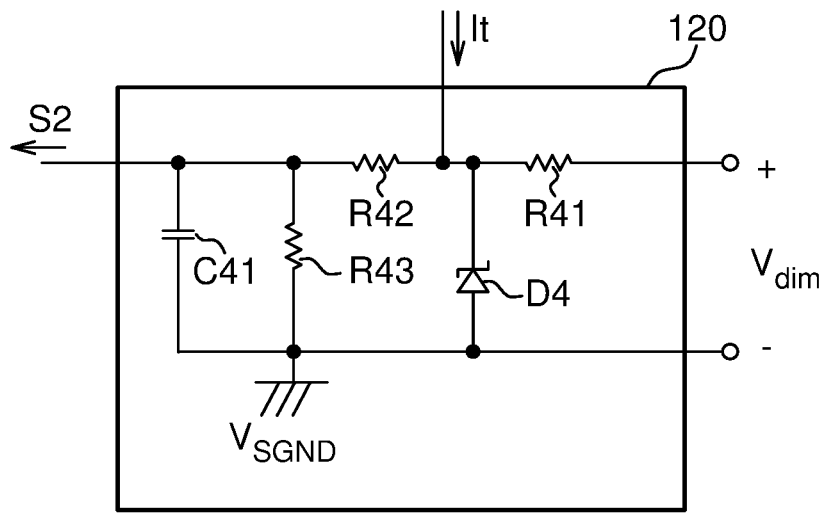
FIG. 4 illustrates a structure of the light control unit of FIG. 3 according to an embodiment.

FIG. 4 illustrates a structure of the light control unit 120 of FIG. 3 according to an embodiment. The light control unit 120 may be include a first resistor R41, a diode D4, a second resistor R42, a third resistor R43 and a capacitor C41. The first resistor R41 may include a first terminal coupled to the first input terminal of the lighting control unit 120, and a second terminal. The diode D4 may include a cathode terminal and an anode terminal where the cathode terminal is coupled to the second terminal of the first resistor R41 and the third input terminal of the lighting control unit 120 to be coupled to the cathode terminal of the thyristor unit 310, and the anode is coupled to the second input terminal of the lighting control unit 120. The second resistor R42 may include a first terminal and a second terminal where the first terminal is coupled to the cathode terminal of the diode D4, and the second terminal is coupled to the output terminal of the lighting control unit 120. The third resistor R43 may be coupled between the second terminal of the second resistor R42 and a voltage reference terminal VSGND. The capacitor C41 may be coupled between the output terminal of the lighting control unit 120 and the voltage reference terminal VSGND. The structure of FIG. 4 is merely an example instead of being used for limiting the structure of the lighting control unit 120.

Figure 5:
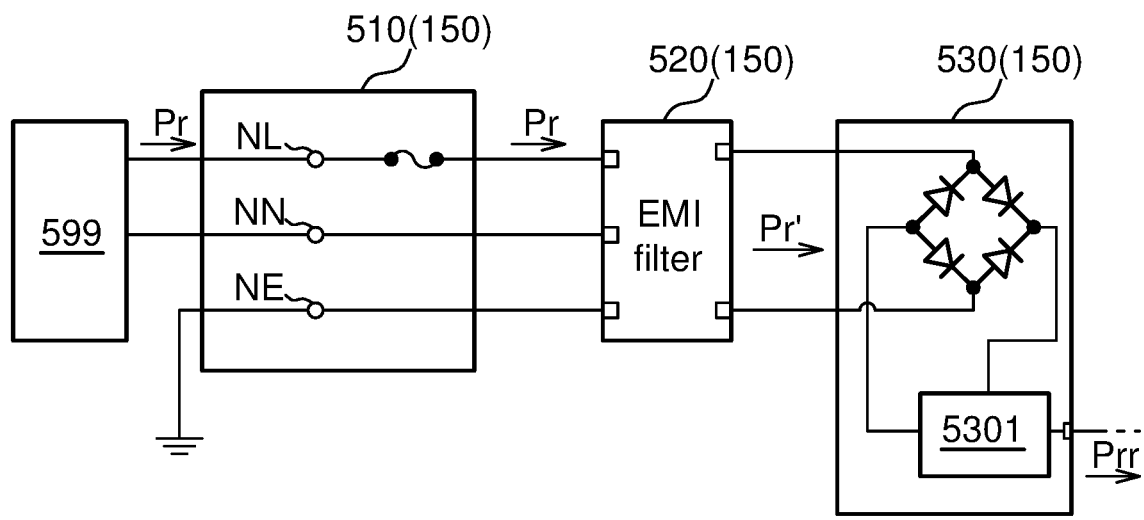
FIGS. 5-6 illustrate block diagrams and related connections of the power control unit according to an embodiment.
Figure 6:
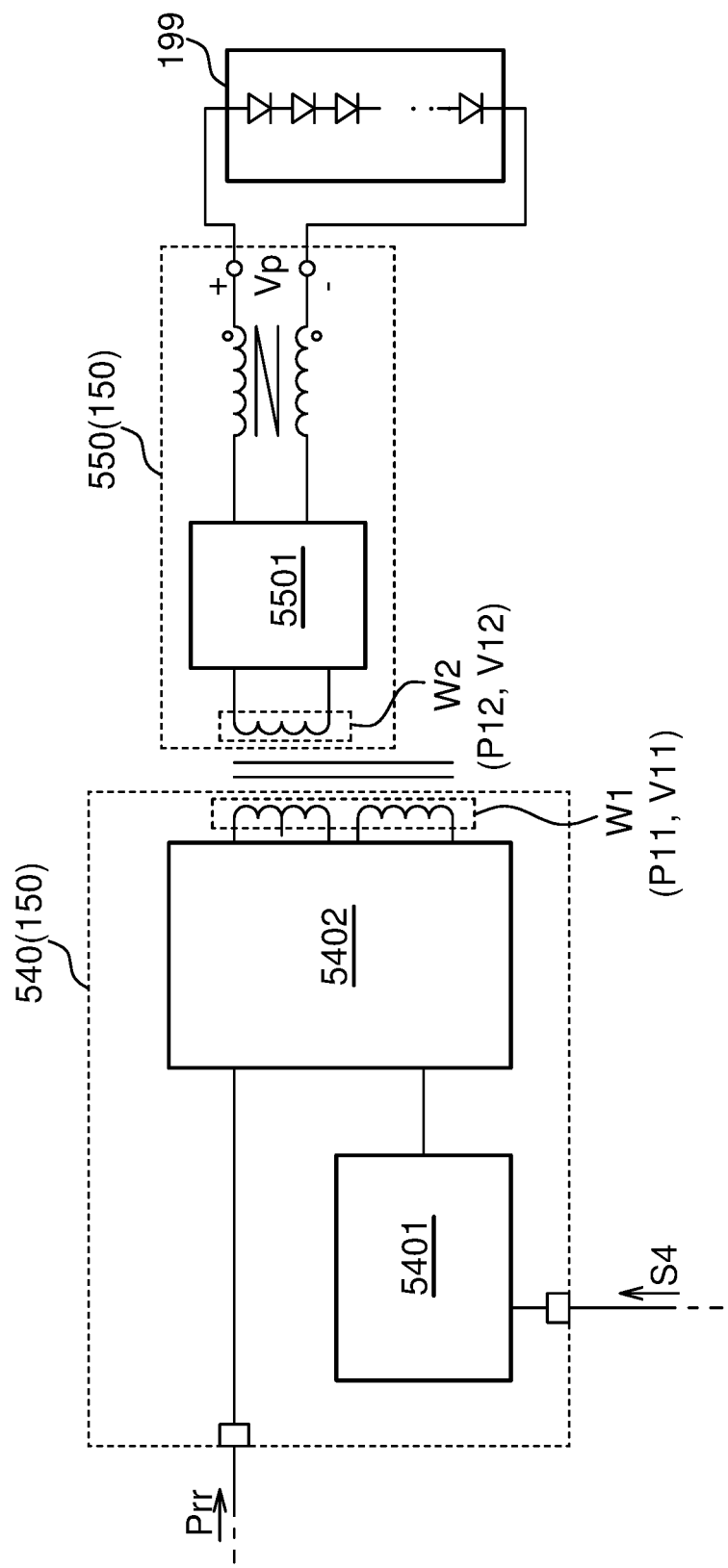

FIGS. 5-6 illustrate block diagrams and related connections of the power control unit 150 according to an embodiment. The power control unit 150 may include a main power unit 510, an electromagnetic interference (EMI) filter 520, a bridge rectifier unit 530, a primary power unit 540, and a secondary power unit 550.

As shown in FIG. 5, the main power unit 510 may include a live-wire node NL, neutral-wire node NN and an earth-wire node NE. The live-wire node NL is used to transmit electrical power Pr from an external mains system 599. The neutral-wire node NN is used to form a completed path corresponding to the live-wire node NL and may have a zero voltage level. The earth-wire node NE is used to provide a safety path for the main power unit 510.

As shown in FIG. 5, the electromagnetic interference (EMI) filter 520 may be used to process the electrical power Pr to reduce noise of the electrical power Pr. The electromagnetic interference filter 520 may include a set of input terminals coupled to the live-wire node NL, the neutral-wire node NN and the earth-wire node NE of the main power unit 510 for receiving the electrical power Pr, and a set of output terminals to output the processed electrical power Pr'.

As shown in FIG. 5, the bridge rectifier unit 530 may be used to rectify the processed electrical power Pr' to generate rectified power Prr. The bridge rectifier unit 530 may include a set of input terminals coupled to the set of output terminals of the electromagnetic interference filter 520 for receiving the processed electrical power Pr', and a set of output terminals for outputting the rectified power Prr. As shown in FIG. 5, the bridge rectifier unit 530 may include a rectifier formed by diodes and a processing circuit 5301.

As shown in FIG. 6, the primary power unit 540 may be used to adjust the rectified power Prr to generate first power P11 corresponding to a first voltage V11 according to the fourth signal S4. The primary power unit 540 may include a first input terminal coupled to the input terminal of the power control unit 150 for receiving the fourth control signal S4, a set of second input terminals coupled to the set of output terminals of the bridge rectifier unit 530 for receiving the rectifier power Prr, and a set of primary windings W1 for sending the first power P11. The primary power unit 540 may include a control circuit 5401 for receiving the fourth control signal S4, and a processing circuit 5402 coupled to the control circuit 5401 and the primary windings W1 for controlling the voltage V11 corresponding to the primary windings W1 according to the fourth control signal S4. The control circuit 5401 may include (but not be limited to) a power control integrated circuit, and the processing circuit 5402 may be formed by diodes, resistors, capacitor and transistors.

The secondary power unit 550 may be used to generate a second power P12 with a second voltage V12 and generate an operation voltage Vp for the set of LEDs of the LED light device 199 according to the second voltage V12. The secondary power unit 550 may include a secondary winding W2 for generating the second voltage V12 according to the first voltage V11 through electromagnetic induction, and a set of output terminals coupled to the set of output terminals of the power control unit 150 for providing the operation voltage Vp. The brightness of the set of LEDs may be determined by the operation voltage Vp, and the operation voltage is corresponding to the fourth signal S4 so as to be determined through the switch unit 110 and the light control unit 120. The secondary power unit 550 may include a processing circuit 5501 formed by diodes, capacitors and resistors.

According to embodiments, the power control unit 150 may provide functions of a transformer to provide an accurate operation voltage, and the output of the power control unit 150 may be rectified and filtered. The output of the power control unit 150 may be of a constant current. FIGS. 1 and 3-6 merely provide block diagrams rather than detailed circuit.

In summary, by means of the driver circuit provided according to an embodiment, brightness of an LED light device may be adjusted more finely since the n first control signals (e.g. S11-S1n) and the second control signal S2 may be adjusted. A solution is provided for alleviating the technical problems in the field.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A driver circuit for controlling brightness of a set of light-emitting diodes, comprising: a switch unit configured to provide multiple first control signals, the switch unit comprising: multiple controllable terminals respectively configured to be set for setting the multiple first control signals; and multiple output terminals of the switch unit corresponding to the multiple controllable terminals and configured to output the multiple first control signals; a lighting control unit configured to generate a second control signal, the lighting control unit comprising: a first input terminal and a second input terminal of the lighting control unit configured to receive a traditional dimming control voltage between the first input terminal and the second input terminal of the lighting control unit; and an output terminal of the lighting control unit configured to output the second control signal according to the traditional dimming control voltage; a control circuit unit configured to generate a third control signal according to the multiple first control signals and the second control signal, the control circuit unit comprising: multiple first input terminals of the control circuit coupled to the multiple output terminals of the switch unit respectively, and configured to receive the multiple first control signals; a second input terminal of the control circuit coupled to the output terminal of the lighting control unit, and configured to receive the second control signal; and an output terminal of the control circuit unit configured to output the third control signal; an optical coupler configured to generate a fourth control signal according to the third control signal, the optical coupler comprising: an input terminal of the optical coupler coupled to the output terminal of the control circuit; and an output terminal of the optical coupler configured to output the fourth control signal; and a power control unit configured to enable the set of light-emitting diodes according to the fourth control signal, the power control unit comprising: an input terminal of the power control unit coupled to the output terminal of the optical coupler; and a set of output terminals of the power control units coupled to the set of light-emitting diodes; wherein the set of light-emitting diodes is configured to emit light according to the fourth control signal, the brightness of the set of light-emitting diodes is determined according to the fourth control signal.

2. The driver circuit of claim 1, wherein:
the driver circuit further comprises a thyristor unit comprising:
an anode terminal configured to receive an anode voltage;
a gate terminal configured to receive a gate voltage; and
a cathode terminal configured to provide an operation current according to the anode voltage and the gate voltage;
the lighting control unit further comprises a third input terminal coupled to the cathode terminal of the thyristor unit, and the lighting control unit is configured to generate the second control signal according to the control voltage and the operation current.

3. The driver of claim 2, wherein the lighting control unit further comprises:
a first resistor comprising a first terminal coupled to the first input terminal of the lighting control unit, and a second terminal;
a first diode comprising a cathode terminal coupled to the second terminal of the first resistor and the third input terminal of the lighting control unit, and an anode coupled to the second input terminal of the lighting control unit;

a second resistor comprising a first terminal coupled to the cathode terminal of the first diode, and a second terminal coupled to the output terminal of the lighting control unit;
a third resistor coupled between the second terminal of the second resistor and a voltage reference terminal; and
a first capacitor coupled between the output terminal of the lighting control unit and the voltage reference terminal.

4. The driver circuit of claim 1, wherein the power control unit further comprises:
a main power unit comprising a live-wire node configured to transmit electrical power from an external mains system, a neutral-wire node configured to form a completed path corresponding to the live-wire node, and an earth-wire node configured to provide a safety path for the main power unit;
an electromagnetic interference (EMI) filter configured to process the electrical power to reduce noise of the electrical power, the electromagnetic interference filter comprising a set of input terminals coupled to the live-wire node, the neutral-wire node and the earth-wire node of the main power unit for receiving the electrical power, and a set of output terminals to output the processed electrical power;
a bridge rectifier unit configured to rectify the processed electrical power to generate rectified power, the bridge rectifier unit comprising a set of input terminals coupled to the set of output terminals of the electromagnetic interference filter for receiving the processed electrical power, and a set of output terminals for outputting the rectified power;
a primary power unit configured to adjust the rectified power to generate first power with a first voltage according to the fourth control signal, the primary power unit comprising a first input terminal coupled to the input terminal of the power control unit for receiving the fourth control signal, a set of second input terminals coupled to the set of output terminals of the bridge rectifier unit for receiving the rectifier power, and a set of primary windings for sending the first power; and
a secondary power unit configured to generate a second power with a second voltage and generate an operation voltage for the set of light-emitting diodes according to the second voltage, the secondary power unit comprising a secondary winding for generating the second voltage according to the first voltage through electromagnetic induction, and a set of output terminals coupled to the set of output terminals of the power control unit for providing the operation voltage;
wherein the brightness of the set of light-emitting diodes is determined by the operation voltage, and the operation voltage is corresponding to the fourth control signal so as to be determined through the switch unit and the lighting control unit.

5. The driver circuit of claim 1, wherein the control circuit unit comprises a microcontroller, an application-specific integrated circuit or a central processing unit.

* * * * *